US009210119B2

(12) United States Patent
LoPorto (10) Patent No.: US 9,210,119 B2
(45) Date of Patent: Dec. 8, 2015

(54) AUTOMATED TRIGGERING OF A BROADCAST

(71) Applicant: Garret J. LoPorto, Concord, MA (US)

(72) Inventor: Garret J. LoPorto, Concord, MA (US)

(*) Notice: Subject to any disclaimer, the term of this patent is extended or adjusted under 35 U.S.C. 154(b) by 0 days.

(21) Appl. No.: 14/231,295

(22) Filed: Mar. 31, 2014

(65) Prior Publication Data

US 2014/0297772 A1   Oct. 2, 2014

Related U.S. Application Data

(60) Provisional application No. 61/806,635, filed on Mar. 29, 2013.

(51) Int. Cl.
*H04L 29/08* (2006.01)
*H04L 12/58* (2006.01)

(52) U.S. Cl.
CPC .............. *H04L 51/32* (2013.01); *H04L 51/34* (2013.01)

(58) Field of Classification Search
CPC ............................ H04L 65/4076; H04L 29/08
USPC .................... 709/206, 225; 705/14.44, 14.68
See application file for complete search history.

(56) References Cited

U.S. PATENT DOCUMENTS

| 7,991,770 | B2 | 8/2011 | Covell |
| 8,010,460 | B2 | 8/2011 | Work |
| 8,620,748 | B1 | 12/2013 | Ruarte |
| 2011/0107369 | A1 | 5/2011 | O'Brien |
| 2012/0215903 | A1* | 8/2012 | Fleischman et al. .......... 709/224 |
| 2013/0046826 | A1 | 2/2013 | Stanton |
| 2014/0164505 | A1* | 6/2014 | Daly et al. .................... 709/204 |

OTHER PUBLICATIONS

"Keyphrase Cloud Generation of Broadcast News" —Marujo et al, Carnagie Mellon Univ., Jun. 2009 http://www.inesc-id.pt/pt/indicadores/Ficheiros/7588.pdf.*

* cited by examiner

*Primary Examiner* — Randy Scott
(74) *Attorney, Agent, or Firm* — Meyertons Hood Kivlin Kowert & Goetzel, P.C.; Jeffrey C. Hood; Brian E. Moore (57) ABSTRACT

Systems and methods for using a subset of a group to determine if a given message or post is suitable for broadcast to the entire group. The method may include receiving and tabulating responses to a stimulus for a first period of time from a portion of the population. It may be determined that the tabulated responses exceed a threshold prior to expiration of a timeout period and the threshold may be based on size of the population or size of the portion of the population. In response to determining that the threshold has been exceeded, a broadcast of the stimulus to the population may be triggered.

20 Claims, 2 Drawing Sheets

AUTOMATED TRIGGERING OF A BROADCAST

PRIORITY DATA

This application claims benefit of priority to U.S. Provisional Application Ser. No. 61/806,635, titled "Method and Apparatus for Broadcast Triggering", filed Mar. 29, 2013, whose inventor is Garret J. LoPorto, which is hereby incorporated by reference in its entirety as though fully and completely set forth herein.

TECHNICAL FIELD

This disclosure relates generally to the field of networked computer systems, data processing systems and communications systems. More particularly the present disclosure relates to the field of broadcast alerts and broadcast communications.

DESCRIPTION OF THE RELATED ART

A social news service or news feed is a stream of communications created by one or many individuals (and/or organizations) and subscribed to by many individuals (and/or organizations). Generally, subscribers following a particular stream of communication share an interest in a particular topic, geographical area (such as a town or city), person, place or thing. The streams of communications, or communication streams, are used to provide subscribers with frequently updated content. In general, the majority of communication streams are Web based and allow users to interact through the services over the Internet, but many have expanded into cellphones and other communications channels as well.

In particular, news feeds, social networking and social news services can present in the form of pages, categories, tags (or hashtags) that many people follow. The followers, or subscribers, may contribute to the actual content of a particular feed in the form of posts and messages. Other subscribers to that feed may receive these posts and messages as part of a feed. For example, some websites, such as REDDIT™ or Digg™, allow subscribers to respond to posts with a vote, such as a sign of affirmation that tells the service to give those posts more prominence in the feed.

However, in general, social news feeds tend to be noisy and full of perpetual streams of new content. Thus, users may spend a whole day just watching feeds and waiting for a good, relevant, timely or important post to show up. Eventually, there may be a post or message that is good, or timely, or relevant enough that it may garner large amounts of affirmative responses from the subscribers currently watching the news feed. Unfortunately, in the prior art, a user must actively be watching news feeds to be made aware of a salient new post, which is so good, relevant, timely or important it is being given significant affirmative response from other subscribers.

Another problem may arise when social networks and social news sites automatically send notifications of new posts or messages to subscribers of a feed. In general, these notifications are often too frequent to be useful or reasonable for busy news feeds, listserves or news groups. Thus, one prior art solution has been delivery of digests, or summaries, of top posts or messages which are groupings of the posts or messages. However, these digests tend to be sent on a regular schedule and often fail to timely notify a subscriber if a post or message of interest is receiving an unusually high frequency of affirmative responses.

Thus, in the prior art, the way subscribers stay immediately aware of any interesting developments or important happenings on their social network, has been to (1) receive emails, texts, or push notifications of low quality or immediate value, or (2) manually check each news feed frequently for important or interesting developments. However, both prior art approaches tend to cost subscribers' valuable attention and time, either with unimportant interruptions or in the vigilant monitoring of their news feeds.

Additionally, due to the above limitations, often, in the prior art, many timely posts and messages with unusually high affirmative response rates by other subscribers on a news feed, will still go unnoticed by many subscribers of that feed, because they are overwhelmed with interruptions and notifications from that feed and/or they failed to check that feed at the opportune time.

Thus, improvement in the broadcast of communication streams is needed.

SUMMARY

Various embodiments of a system and method for triggering notification to a population or subscriber community. The method may include receiving and tabulating responses to a stimulus during a first time period from a portion of the population. It may be determined that the tabulated responses during the first time period exceed a threshold prior to expiration of the timeout period. The threshold may be based on size of the population or size of a portion of the population. A broadcast of the stimulus to the population may be triggered to notify the population of the stimulus or deliver the stimulus to the population.

In certain embodiments, the method may also include receiving and tabulating responses to a second stimulus during a second time period. It may be determined that the tabulated responses during the second time period exceed the threshold. It may be determined that a time period between publication of the stimulus and publication of the second stimulus exceeds a specified duration of time and broadcast of the second stimulus to the population may be triggered in response.

In another embodiment, the method may include receiving and tabulating responses to a second stimulus during a second time period. It may be determined that the tabulated responses during the second time period exceed a second threshold. The second threshold may be based on elapsed time since publication of the stimulus. Additionally, it may be determined that a time period between publication of the stimulus and publication of the second stimulus exceeds a specified duration of time and broadcast of the second stimulus to the population may be triggered in response.

In certain embodiments the stimulus may include one or more of a message, a post, an email, a voicemail, a text, a push of a button, a picture, a sound, or a result.

In some embodiments, the responses may include one or more of upvotes, likes, reposts, shares, comments, openrates, click-through rates, retweets, follows, votes, hang-up rates, or texts.

In an exemplary embodiment, receiving responses to the stimulus may be via a first communication medium and triggering the broadcast of the stimulus to the population may include triggering the broadcast of the stimulus via a second communication medium. The first communication medium may be distinct from the second communication medium. In one such embodiment, the first communication medium may be a post to an electronic message board and the second communication medium may be an email. In another embodiment, the stimulus may be an alert of a local emergency, the first communication medium may be a text to a number for local emergencies, and the second communication medium may be an emergency alert system.

In one embodiment, the method may further include determining size of the portion of the population. In such embodiments, determining that the tabulated responses exceed the threshold may include determining that that the size of the portion of the population exceeds a specified value.

In another embodiment, the method may further include receiving time of publication of a second stimulus and starting a second timer in response. Responses to the second stimulus may be received and tabulated. It may be determined that tabulated responses exceed the threshold prior to expiration of the second timeout period and that time of publication between the stimulus and the second stimulus exceeds a specified duration of time. Further, it may be determined that a maximum number of broadcasts have been triggered in a window of time, and in response, a broadcast of the second stimulus to the population may not be triggered because the maximum number of broadcasts for the time window may have been exceeded.

In an exemplary embodiment, a non-transitory computer readable memory medium may store programming instructions executable by a processor to perform the above described method. Further, in certain embodiments, a system may include at least one functional unit, and the functional unit may be configured to perform the above described method.

BRIEF DESCRIPTION OF THE DRAWINGS

A better understanding of the present disclosure can be obtained when the following detailed description of the preferred embodiment is considered in conjunction with the following drawings, in which.

While the disclosure is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

Terms

The following is a glossary of terms used in the present application:

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Memory Medium—any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, EEPROM, etc.; a nonvolatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—refers to any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPod™), laptops, tablets (e.g., iPad™, Android™-based tablets), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Wide Area Network—refers a network that covers a broad area (i.e., any telecommunications network that links across metropolitan, regional, or national boundaries) using telecommunication lines. Note that the Internet may be considered a wide area network.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in one embodiment, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Comprising—this term is open-ended. As used in the appended claims, this term does not foreclose additional structure or steps. Consider a claim that recites: "A system comprising a display . . . . " Such a claim does not foreclose the apparatus from including additional components (e.g., a voltage source, a light source, etc.).

Configured To—various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

First, Second, etc.—these terms are used as labels for nouns that they precede, and do not imply any type of ordering (e.g., spatial, temporal, logical, etc.). For example, in a system having multiple tracking sensors (e.g., cameras), the terms "first" and "second" sensors may be used to refer to any two sensors. In other words, the "first" and "second" sensors are not limited to logical sensors 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

FIG. 1

System for Triggering Broadcast Notifications to a Population

Figure 1:
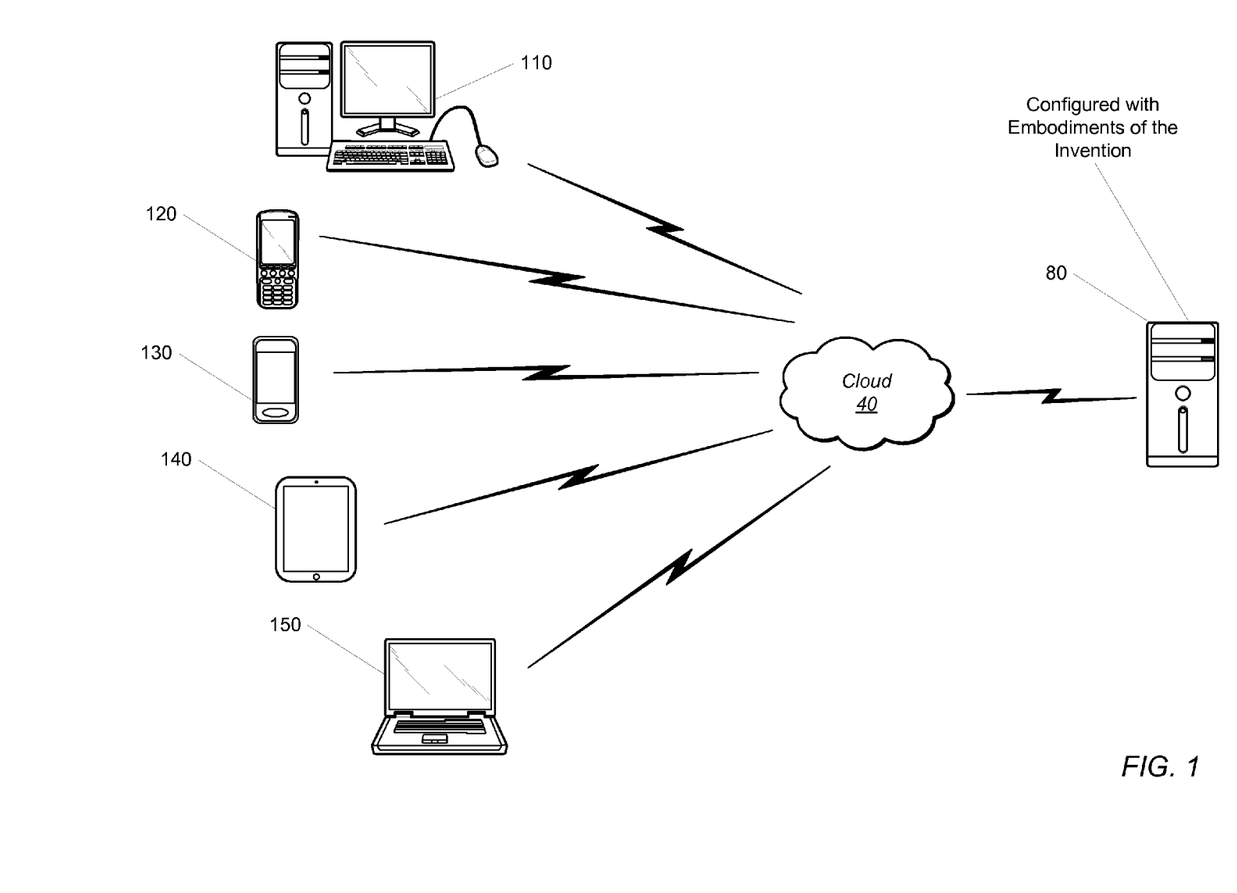
FIG. 1 illustrates an embodiment of a system for triggering notification of a broadcast to a population, according to embodiments.

FIG. 1 illustrates an exemplary embodiment of a system for triggering notification of a broadcast to a population or subscriber community. As illustrated, a member of a population may interact with a server 80 via a cloud 40 using various computing and user equipment devices such as computer 110, cell phone 120, smart phone 130, tablet 140, and laptop 150, among other devices. In certain embodiments, cloud 40 may be included in a network, such as a wide area network. Thus, in certain embodiments, subscribers may interact, i.e., communicate with, server 80 over a network such as a wide area network. Note that the interaction may include subscribers receiving stimulus from server 80 and sending responses to server 80 via cloud 40 using user equipment. Note that the term user equipment generally refers to any of various types of computer systems devices which are mobile or portable and which performs wireless communications. Examples of user equipment devices include mobile telephones or smart phones (e.g., iPhone™ Android™-based phones), portable gaming devices (e.g., Nintendo DS™, PlayStation Portable™, Gameboy Advance™, iPod™), laptops, tablets (e.g., iPad™, Android™-based tablets), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

In one embodiment, server 80 may include a memory medium. The memory medium may store program instructions executable by a processor. Alternatively, the programming instructions may be executable by a functional unit. Note that the term functional unit refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof. Thus, the memory medium may include programming instructions executable to perform a method for determining, based on initial responses to a message or news feed post, if it would be advantageous to alert the entire subscriber community of that particular post. In certain embodiments, the method may include use of a sample population or subset of a group, i.e., a subscriber group, to determine if a given message or post may be suitable for broadcast to an entire population or group, i.e., the subscriber group. Accordingly, determining if a given message or post may be suitable for broadcast to the subscriber group may include measuring the sample population's response to the message or post, comparing the measured response to a threshold value, and in response to determining that the measured response exceeds, i.e., is greater than, the threshold, triggering the broadcast of the message to the entire group or population, i.e., the subscriber group.

In one embodiment, a logic module may be included in message and news feed programs and group notifications and/or broadcast communications. Note that the term logic module generally refers to programming instructions executable by a processor or functional unit. Thus, the logic module may instruct a processor to perform the functions of taking tabulations of responses from a sample population to a stimulus, message or post, comparing those tabulations to "threshold values", determining whether that stimulus, message, or post received responses that cross the "threshold values," and if so, triggering a broadcast of that stimulus, post or message to the entire group (often via some other alert medium). Note that in various embodiments, the stimulus delivered to the subscribers, audience or population may be a message, a post, an email, a voicemail, a sound, a light, a vibration, a song, a video, a smell, a sensation, an injection and/or any other stimulus that may be responded to, among others.

In one embodiment, response values may include values such as "upvotes," "likes," "reposts," "shares," comments, open-rates, click-through rates, hang-up rates, texts or any other measurable feedback from a sample population. Tabulation or measurement of these responses may be compared to a response threshold value to determine if the post or message will be broadcast. The threshold may be based on the size of the population of the size of a portion of the population. Note that in certain embodiments, the broadcast may be of a different medium than the original post or message. For example, in one embodiment, a bulletin board post with sufficient comments response, i.e., responses exceed response threshold, may trigger an email broadcast. In another embodiment, an email message to a small sample of a larger list, or subscriber group, with sufficient open-rate, i.e., responses exceed response threshold, may automatically trigger that email message to be broadcast to the whole list, or subscriber group. In yet another embodiment, a phone message delivered to a sample of a population with a low enough hang-up rate, i.e., responses exceed response threshold, may trigger that message to be called out to the whole population, or subscriber group. In an exemplary embodiment, a post to a feed of a social news service that may receive sufficient "up-votes" in a given span of time, i.e., responses exceed response threshold, may trigger an email broadcast to all subscribers of that feed and/or it may trigger smartphone push notifications of that post, text messages of that post, or any other suitable broadcast of the contents of that post.

FIG. 2

Figure 2:
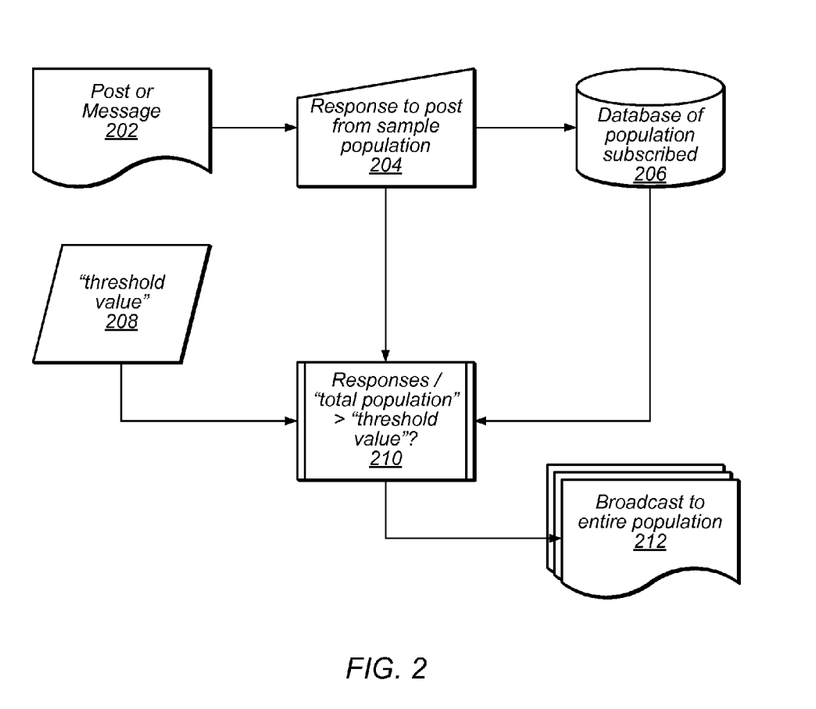
FIG. 2 is a block diagram of a method for triggering notification of a broadcast to a population, according to embodiments.

Flow Chart of a Method for Automatically Triggering Broadcast Notifications to a Population FIG. 2 illustrates a flow chart of an exemplary method for automatically triggering notification of a broadcast to a population. The method shown in FIG. 2 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 202, a post or message, or other type of communication may be published. The publication may occur by sending the message to a server, or computer system, via a network or a wide area network. Alternatively, the publication may occur by broadcast of the message or post to a portion of a community, via text, email, or some other notification, or stimulus, method as known in the art.

At 204, responses to the broadcast notification or stimulus may occur. In other words, the post or message may stimulate responses from a portion of the subscriber population. Said another way, the post or message may stimulate response from a sample population. Note that the population may interact with the post or message via a network such as wide area network using computer systems or user equipment devices as described above.

At 206, a database of the population of subscribers may be accessed. The access of the database may allow for the comparison of the sample population to the total population.

At 208, a threshold value may be specified. The threshold value may be static and dependent, or based on, the total number of subscribers, or the number of subscribers in the sample population. It may be a percentage or other numerical value.

At 210, a logic module, i.e., computer readable programming instructions, may divide the number of responses by the total population getting a "result" and may compare the "result" to the "threshold value". In the exemplary embodiment shown, if the "result" is greater than the "threshold value" the broadcast of the post or message at 202 may be broadcast to the entire population of subscribers held in the database.

Further Embodiments

In further embodiments, the above described systems and methods may be used in a variety of networked computer, social news service, social news feed, and communications systems. It will be appreciated however, that these embodiments are not the only embodiments in which the invention may be implemented. Rather it may find utility in a variety of computer and communications configurations, as will become apparent from an understanding of the principles that underlie the invention. Further, the numbers and percentages throughout this description are used merely as exemplary examples of the very broad numerical ranges the invention may embody.

Thus, in one embodiment, a social network may include a plurality of users that may be subscribed to a particular news feed, and any user may be permitted to post, or broadcast, news or messages to that feed. Those posts and messages, in turn, may become visible to other subscribed users browsing new posts of that news feed at that time. Additionally, users subscribed to the news feed may have the ability to vote up or vote down posts by others to the news feed. A user voting up a post may be considered a response of affirmation that the content of that post may be helpful to the user.

Accordingly, the social network or news service may track, among other data, the number, or quantity, of users subscribed to a particular news feed; the portion of subscribers that may have been exposed to each post on that feed; and the quantity of the portion of subscribers that may have voted up each post.

In such an embodiment, the logic module, which may be stored in a computer accessible memory medium on a server, such as server 80 described above, may receive from the social network, which may also be stored, or hosted by, the server, a tally of the number of responses, or "up-votes," of a post, the total number of subscribers for the post's news feed, and the response, "up-vote," threshold value for that particular news feed. In one embodiment, the threshold value, or threshold, may be a numerical percentage, such as 30%. Thus, in order to determine if the threshold is exceed, the number of responses to the post may be divided the number of subscribers, or population size, of the news feed and may compare the result to the threshold. Accordingly, if the result is greater than the threshold, the logic module may trigger an email broadcast to all subscribers of the news feed, notifying them of the post which has garnered enough responses to exceed the threshold.

Note that in various embodiments, the threshold may be any percentage from 0% to 100% or more, yielding different behaviors appropriate to different communities and populations. For example, larger subscriber population social news services may find utility in a threshold closer to 3% or even less.

In certain embodiments, triggering of a broadcast to the entire population may be further dependent on the time since publication of the stimulus, or post. In such embodiments, triggering of a broadcast of a post may only occur if the threshold is exceeded within a specified duration of time since a post was published. Thus, for example, if the specified duration was set to 24 hours, and a post's responses exceed the threshold after 24 hours, the broadcast to the entire population may not be triggered; however, if the post's responses exceed the threshold within 24 hours of original publication, then the broadcast to the entire population may be triggered.

In some embodiments, triggering of the broadcast may be further dependent upon a sample size of the portion of the population. Thus, in such embodiments, a minimum sample size value may be specified in addition to specification of the response threshold value. In such embodiments, a precondition to determining whether the threshold may have been exceeded may be determining whether the minimum sample size may have been exceeded, or obtained. Thus, for example, the sample size value may be specified at 2% of the population and the response threshold value may be specified at 30% of the population.

In an exemplary embodiment, the broadcast of a second post may be dependent upon the time since a prior broadcast of a first post. In other words, the broadcast frequency, or the time between broadcast of posts meeting the criteria for broadcast to the entire population, may be specified, either statically or dynamically. Thus, in one embodiment, the broadcast frequency may be statically specified by a wait, or delay, time between broadcast of posts to the entire population. Alternatively, or in addition to, the broadcast frequency may be dynamically specified by adjustment of the threshold as a factor of time since the prior broadcast to the entire community.

Thus, in one embodiment, a time delay between broadcasts to the entire community may allow the population from becoming overwhelmed with broadcasts, or notifications. For example, the threshold may be initially specified at 30% and any post or message that may receive an affirmative response from 30% or more of the population may trigger an initial, or first, broadcast. However, immediately after the first broadcast, additional broadcasts may be blocked or delayed for a specified wait time, or specified period of time. For example, the wait time may be specified as 1 hour; thus, no additional broadcasts to the entire population may be triggered during the wait time, or period. However, once the wait time elapses, broadcasts to the entire population may resume.

In certain embodiments, instead of, or in addition to, the wait, or delay, between broadcasts to the entire community, a multiplier of the threshold value may be introduced thereby further restricting the broadcast frequency. In other words, if the initial threshold for triggering a broadcast is specified at a certain percentage, then after a first broadcast, a multiplier may be introduced and the threshold value may be increased accordingly. For example, assume the threshold for triggering a broadcast is specified at 30%. Then, if a multiplier is specified as 3, then the threshold to trigger a second broadcast may be 90%. Thus, to achieve 2 broadcasts one hour apart may require 90% of the subscribers to "up vote" that second post.

In an exemplary embodiment, the product of the multiplier and threshold may be reduced step wise or proportionally as a function of the time elapsed since the prior post. Thus, for example, the product may be reduced stepwise for every time period that may elapse since the prior post. In other words, the requirement for triggering a broadcast may be reduced stepwise. For example, if the initial requirement for triggering a broadcast after a first broadcast may have been triggered was specified at 90%, and a stepwise reduction may reduce the requirement by 2% for every hour elapsed since the first broadcast, then, after 1 hour has elapsed since the first broadcast, the requirement would reduce to 88%. The reduction may continue until the requirement may be equivalent to the threshold. In other embodiments, the increase and gradual decrease of the requirement for triggering a second broadcast may be achieved using logarithms or asymptotic equations resulting in a more curved, or proportional, reduction in threshold value over time.

Such embodiments may be advantageous in scenarios where an entire population of subscribers to a feed is notified of a post or message on it and many more subscribers than usual begin browsing the feed at the same time. This may cause other messages or posts on that feed to receive unusually high response rates because of the additional traffic the feed may receive from the overall population. In turn, the increase in traffic may cause a static threshold of the other messages or posts, which may have been appropriate for average traffic levels, to be unintentionally exceeded causing multiple broadcasts for multiple posts to be triggered in quick succession due to the unusually high traffic caused by the first broadcast. Thus, the additional requirement for broadcast may solves this issue.

In yet another embodiment, after a specified, or optimal, amount of time between triggering of broadcasts elapses, the requirement for broadcasts may be slowly reduced by using a fractional multiplier against the "threshold value" and slowly decreasing the fractional multiplier until a broadcast is triggered. For example, the optimal frequency of broadcasts may be 1 per week, and, if after 1 week has elapsed since the prior broadcast, the fractional multiplier may be applied to the threshold. The threshold may then be reduced using the fractional multiplier at specified intervals until another broadcast may be triggered.

In further embodiments, the frequency of broadcasts may be further dependent upon the time since the previous 2 or more broadcasts. Such an embodiment may allow for the limiting of the total number of broadcasts triggered over a period of time.

In yet another embodiment, an email message may be sent to a small sample of email recipients from a larger email list (population). In such embodiments, the response threshold may be an open-rate or click-through-rate.

In another embodiment an automated phone message may be played to a sample of a population with automated phone calls and the hang-up rate may serve as the response value. In such embodiments, the threshold may be a ceiling and triggering of the broadcast to the entire population may require the response rate to not exceed the threshold. Alternatively, such embodiments may be enabled by use of the hang-up rate to calculate a positive response rate that may be required to exceed a threshold.

Note that in certain embodiments, the original posts or messages may be made through almost any interactive medium such as message boards, social networks, social news sites, cell phone texting, automated phone prompts like "press 1 to up vote," and the subsequent broadcast may be in any form including emails, text messages, phone calls, push notifications, instant messages, even air-raid sirens, sound, music, lighting, imagery, video or any other suitable notifications, alerts, or actions of any kind that one might want triggered by an early response.

In any of the above embodiments the user may be prompted to choose which notification methods they want to receive. Various systems may allow subscribers to set themselves to be sent broadcast notifications of only some or none of the select feeds they are subscribed to.

Another embodiment may include having a phone number that any user may or dial to alert others of urgent or emergency situations and exceeding the threshold may trigger an urgent response, air raid sirens or emergency alert systems. Such an embodiment may be further refined by creation of a prompt for the user, such as, "Are you calling (or texting) about X?" The prompt may be entered or generated by the initial caller and if enough users respond affirmatively, the threshold may be exceeded and then X may be broadcast to alert systems, including TV, radio, Internet etc.

Additional Embodiments

In certain embodiments of the above described systems and methods, the popularity of the user posting or generating the initial broadcast stimulus may reduce the threshold for broadcast to the entire population. The popularity of the user may be based on prior broadcasts of the user exceeding the threshold. Similarly, users who may have had broadcasts or posts debunked may have their future broadcasts penalized resulting in an increased threshold for triggering broadcast to the entire community.

In certain embodiments, this invention could be used as a form of instant democracy where "decisions" may be arrived at like broadcasts. Thus, whenever a critical mass of present members of a particular group votes for a particular decision, that decision may be considered the result of that vote. Hence, a group may set the system to consider a consensus by just 10% of the entire group would be enough to establish a quick consensus decision until the larger group is notified and has a chance to convene.

Further, embodiments of the invention may be employed to create a responsive collective intelligence organization. For example, there may be a hierarchy where the top three super groups may be the ultimate decision makers. Below each supergroup may be a number of subgroups. Below each subgroup may be a child group of users. When a user has a salient message, the user may submit the message to their child group who may affirm or deny this message as worthy of escalation, attention, vote and/or action. If the majority (or some preset number or percentage) of the child group affirms the message, the message may be "escalated" and sent from the child-group to the other child-groups of its subgroup. Each of the users of each child-group may vote in their child-group whether to affirm or deny the message as worthy of escalation, attention, vote and/or action. If one of child-groups comes up with a vote result to affirm and some to deny, each child-group's cumulative result may be tallied as discreet votes (like a republic) or may be tallied together like a purely democratic vote (counting every users vote). Thus, if the affirmative votes meet or exceed a particular threshold, the message may then be "escalated" and conveyed from the subgroup of child-groups to the subgroup's peer subgroups. Each of the child-groups of each peer subgroup receiving the message then presents a "vote" to their users as to whether to affirm the message for further "escalation" in either a republic-like tally of their votes or democratic tally takes place. If the majority (or some preset number or percentage) of the subgroups (or their constituents) of a supergroup vote to escalate this message, the supergroup may present the message to the other supergroups for delivering and voting on by their subgroups, child-groups and users. This may result in a rapid, relatively noiseless message delivery system and/or democratic consensus building network, which may be used to develop collective intelligence. In another embodiment, "expert" or "moderator" individuals or groups at each group level may be included and may be automatically notified and asked for their input to "veto" or escalate the message. If a post has received affirmation from a subset of regular early voters, the program may decide to broadcast to the rest of the regular early voter group to determine from their responses to the message if it crosses a threshold to be broadcast to the entire group.

It should be noted that the above-described embodiments are exemplary only, and are not intended to limit the invention to any particular form, function, or appearance. Moreover, in further embodiments, any of the above features may be used in any combinations desired. In other words, any features disclosed above with respect to one method or system may be incorporated or implemented in embodiments of any of the other methods or systems.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A method for triggering notifications to a population, comprising:

receiving, via a network, responses to a first stimulus from a portion of the population, wherein said receiving is performed for a first period of time;

tabulating, via a computer system, the responses to the first stimulus received during the first time period from the portion of the population;

determining, via the computer system, that the tabulated responses to the first stimulus exceed a first threshold during the first time period;

triggering, via the computer system, broadcast of the first stimulus to the population in response to said determining that the tabulated responses exceed the first threshold during the first time period, wherein said triggering operates to notify the population of the first stimulus;

receiving, via the network, responses to a second stimulus from the portion of the population, wherein said receiving is performed for a second period of time;

tabulating, via the computer system, the responses to the second stimulus during the second time period from the portion of the population;

determining, via the computer system, that the tabulated responses to the second stimulus exceed the first threshold or exceed a second threshold during the second time period, wherein the second threshold is based on elapsed time since broadcast;

determining, via the computer system, that a time period between broadcast of the stimulus and broadcast of the second stimulus exceeds a specified duration of time; and triggering, via the computer system, broadcast of the second stimulus to the population in response to said determining that the tabulated responses to the second stimulus exceed the first threshold or the second threshold and said determining that the time period between broadcast of the stimulus and broadcast of the second stimulus exceeds a specified duration of time, wherein said triggering operates to notify the population of the second stimulus.

2. The method of claim 1, wherein the first threshold is based on size of the population.

3. The method of claim 1, wherein the first threshold is based on size of the portion of the population.

4. The method of claim 1, wherein the stimulus comprises one or more of:
   a message;
   a post;
   an email;
   a call;
   a voicemail;
   a text;
   a push of a button;
   a picture;
   a video;
   a sound; or
   a result.

5. The method of claim 1, wherein the responses comprise one or more of:
   upvotes;
   likes;
   reposts;
   shares;
   comments;
   open-rates;
   click-through rates;
   retweets;
   follows;
   votes;
   donations;
   purchases;
   hang-up rates;
   texts.

6. The method of claim 1, wherein said receiving responses to the first stimulus is via a first communication medium, wherein said triggering the broadcast of the first stimulus to the population comprises triggering the broadcast of the first stimulus via a second communication medium, and wherein the first communication medium is distinct from the second communication medium.

7. The method of claim 6, wherein the first communication medium is a post to an electronic message board or social media feed, wherein the second communication medium is an email or text notification.

8. The method of claim 6, wherein first the stimulus is an alert of a local emergency, where in the first communication medium is a text or call to a number for local emergencies, wherein the second communication medium is an emergency alert system.

9. The method of claim 1, further comprising:
   determining, via the computer system, that a maximum number of broadcasts have been triggered during a second specified duration of time, wherein the second specified duration of time is greater than the first specified duration of time; and
   not triggering, via the computer system, broadcast of the second stimulus to the population in response to said determining that the maximum number of broadcasts has been triggered during the second specified duration of time.

10. A non-transitory computer readable memory medium storing programming instructions executable by a processor to:
   receive, via a network, responses to a first stimulus from a portion of population, wherein said receiving is performed for a first period of time;
   tabulate, via the computer system, the responses to the first stimulus received during the first time period from the portion of the population;
   determine, via the computer system, that the tabulated responses exceed a first threshold during the first time period;
   trigger, via the computer system, broadcast of the first stimulus to the population in response to said determining that the tabulated responses exceed the first threshold during the first time period, wherein said triggering operates to notify the population of the stimulus
   receive, via the network, responses to a second stimulus from the portion of the population, wherein said receiving is performed for a second period of time;
   tabulate, via the computer system, the responses to the second stimulus during the second time period from the portion of the population;
   determine, via the computer system, that the tabulated responses to the second stimulus exceed the first threshold or exceed a second threshold during the second time period, wherein the second threshold is based on elapsed time since broadcast;
   determine, via the computer system, that a time period between broadcast of the stimulus and broadcast of the second stimulus exceeds a specified duration of time; and
   trigger, via the computer system, broadcast of the second stimulus to the population in response to said determining that the tabulated responses to the second stimulus exceed the first threshold or the second threshold and said determining that the time period between broadcast of the stimulus and broadcast of the second stimulus exceeds a specified duration of time, wherein said triggering operates to notify the population of the second stimulus.

11. The non-transitory computer readable memory medium of claim 10, wherein the first threshold is based on size of the population.

12. The non-transitory computer readable memory medium of claim 10, wherein the first threshold is based on size of the portion of the population.

13. The non-transitory computer readable memory medium of claim 10, wherein said receiving responses to the first stimulus is via a first communication medium, wherein said triggering the broadcast of the first stimulus to the population comprises triggering the broadcast of the first stimulus via a second communication medium, and wherein the first communication medium is distinct from the second communication medium.

14. The non-transitory computer readable memory medium of claim 13, wherein first the stimulus is an alert of a local emergency, where in the first communication medium is a text or call to a number for local emergencies, wherein the second communication medium is an emergency alert system.

15. The non-transitory computer readable memory medium of claim 10, wherein the programming instructions are further executable by a processor to:
   determine, via the computer system, that a maximum number of broadcasts have been triggered in during a second specified duration of time, wherein the second specified duration of time is greater than the first specified duration of time; and
   not trigger, via the computer system, broadcast of the second stimulus to the population in response to said determining that the maximum number of broadcasts has been triggered during the second specified duration of time.

16. The non-transitory computer readable memory medium of claim 10, wherein the stimulus comprises one or more of:
   a message;
   a post;
   an email;
   a call;
   a voicemail;
   a text;
   a push of a button;
   a picture;
   a video;
   a sound; or
   a result.

17. The non-transitory computer readable memory medium of claim 10, wherein the responses comprise one or more of:
   upvotes;
   likes;
   reposts;
   shares;
   comments;
   open-rates;
   click-through rates;
   retweets;
   follows;
   votes;
   donations;
   purchases;
   hang-up rates;
   texts.

18. The non-transitory computer readable memory medium of claim 13, wherein the first communication medium is a post to an electronic message board or social media feed, wherein the second communication medium is an email or text notification.

19. A method for triggering notification of a stimulus from a first peer group to a peer supergroup, comprising:
   receiving, via a network, responses to a stimulus from a first subgroup during a first period of time; wherein the first subgroup is a portion of a first peer group, wherein the first peer group is comprised in a hierarchy of peer groups, wherein the first subgroup is lowest on the hierarchy, wherein a peer supergroup is highest in the hierarchy, and wherein one or more additional peer groups are between the first subgroup and the peer supergroup;
   tabulating, via the computer system, responses to the stimulus from the first subgroup during the first period of time;
   determining, via the computer system, that the tabulated responses during the first period of time exceed a threshold, wherein the threshold is based on size of the subgroup;
   triggering, via a computer system, broadcast of the stimulus over the network to the first peer group, wherein said triggering operates to further broadcast the stimulus to the first peer group, in addition to the first subgroup; and
   for each additional peer group between the first peer group and the peer supergroup in the hierarchy, repeating said receiving responses, said tabulating, said determining, and said triggering, thereby further broadcasting the stimulus over the network to the peer supergroup, in addition to the first subgroup and the first peer group.

20. The method of claim 19, wherein said receiving responses to the stimulus is via a first communication medium, wherein said triggering the broadcast of the stimulus comprises triggering the broadcast of the stimulus via a second communication medium, and wherein the first communication medium is distinct from the second communication medium.

* * * * *